US005739939A

United States Patent [19]

Merritt

[11] Patent Number: 5,739,939

[45] Date of Patent: Apr. 14, 1998

[54] OUTPUT SCANNER

[75] Inventor: Paul Antony Merritt, Hertfordshire, United Kingdom

[73] Assignee: Crosfield Electronics Limited, Hertfordshire, Great Britain

[21] Appl. No.: 688,788

[22] Filed: Jul. 31, 1996

[30] Foreign Application Priority Data

Aug. 16, 1995 [GB] United Kingdom .................. 9516771

[51] Int. Cl.$^6$ .................................................. G02B 26/08

[52] U.S. Cl. .......................... 359/204; 359/212; 359/220; 359/198; 347/239; 347/243

[58] Field of Search ..................................... 359/196, 197, 359/198, 204, 212, 220; 347/239, 243; 358/474, 491, 493

[56] References Cited

U.S. PATENT DOCUMENTS

| | | | |
|---|---|---|---|
| 5,097,351 | 3/1992 | Kramer | 359/17 |
| 5,214,528 | 5/1993 | Akanabe et al. | 359/211 |
| 5,497,252 | 3/1996 | Ben-David | 359/197 |
| 5,502,709 | 3/1996 | Shinada | 359/204 |

FOREIGN PATENT DOCUMENTS 0 557 998 A2 9/1993 European Pat. Off. .

*Primary Examiner*—Paul M. Dzierzynski
*Assistant Examiner*—Darren E. Schuberg
*Attorney, Agent, or Firm*—Sughrue, Mion, Zinn, Macpeak & Seas, PLLC

[57] ABSTRACT

An output scanner for recording an image on a radiation sensitive medium comprises an at least part cylindrical support which carries the medium in use, the medium facing radially inwardly. A scanning unit is positioned radially inwardly of the support and has a generator for generating a plurality of modulated radiation beams, the beams being modulated with respective image information, and a reflector for reflecting the two beams onto the medium at respective, different positions. Optics focus the beams onto the medium. Motors cause relative rotation and traverse movement between the scanning unit and the support about and along the axis of the support respectively.

8 Claims, 2 Drawing Sheets

CONTROL
DATA
MODULATED
OPTICAL LINK
POWER
29
30
31
22
24
40
20
23
3
32
21
28
26
2
27
41
42
43
44
45

OUTPUT SCANNER

FIELD OF THE INVENTION

The invention relates to an output scanner for recording an image on a radiation sensitive medium and is particularly concerned with so-called internal drum image setters.

DESCRIPTION OF THE PRIOR ART

In a conventional internal drum imagesetter a beam from a laser traverses along the axis of the cylinder holding a light sensitive medium. The beam is focused and reflected from a coaxially rotating mirror and is imaged on to the static medium surface. The mirror traverses along the drum axis in synchronism with the rotation causing the focused spot to be scanned in a raster pattern across the medium.

The rate at which an image can be exposed is ultimately limited by the modulation rate of the source and the rotation rate of the mirror or spinner. As the rotation rate of the spinner is increased centrifugal forces produce an increasing amount of distortion in the mirror surface. This distortion leads to a degradation in the quality of the spot imaged on the medium which at some point becomes unacceptable. It is therefore desirable to increase the number of imaged spots which enable the productivity of the imagesetter to be improved with increasing the spinner rotation rate.

Various attempts have been made in the past to utilize multiple beams but all must cope with the problem that the resulting spots on the record medium will precess around each other as the mirror rotates. This can be understood by considering two parallel beams offset in the vertical direction which are aligned along the drum axis and imaged onto the surface to from two focused spots. When the mirror directs the spots to the bottom of the drum they are offset horizontally. However when they are directed to the side of the drum, horizontally, they will be offset vertically.

One attempt at dealing with this is described in U.S. Pat. No. 5,214,528 in which a special trapezoidal prism is used. Another solution is described in U.S. Pat. No. 5,097,351 in which the two beams are linearly polarised with their polarisations in different directions and one is deflected relative to the other prior to impinging upon the rotating mirror, the amount of deflection being varied to eliminate the precessing effect.

All these prior attempts require relatively complex apparatus to implement them.

SUMMARY OF THE INVENTION

In accordance with the present invention, an output scanner for recording an image on a radiation sensitive medium comprises an at least part cylindrical support which carries the medium in use, the medium facing radially inwardly; a scanning unit positioned radially inwardly of the support and having means for generating a plurality of modulated radiation beams, the beams being modulated with respective image information, and a reflector for reflecting the two beams onto the medium at respective, different positions; means for focusing the beams onto the medium; and means for causing relative rotation and traverse movement between the scanning unit and the support about and along the axis of the support respectively.

With this invention, we avoid any problem of differential rotation between two or more beams by mounting the means for generating the beams and the reflector on the scanning unit. Consequently, there will be no precession of the beams and phase lock will be automatically achieved.

Conveniently, the focusing means is mounted on the scanning unit although this is not essential since the focusing means does not have to rotate.

It is necessary to couple power and data for modulating the beams onto the scanning unit. This can be achieved in a variety of ways.

As far as power coupling is concerned, in the simplest approach, a power source is mounted on the scanning unit. However, this is often impractical when the scanning unit rotates and in the preferred arrangement, the scanner further comprises an inductive power coupling system having one portion mounted on the scanning unit and another portion separate from the scanning unit and coupled in use to a power source, the two portions being positioned so that they cooperate to enable power to be inductively coupled from one portion to the other.

Other methods of coupling power onto the scanning unit include RF transmission and optical power coupling.

As far as the generation of modulation control signals is concerned, again a suitable control signal generator could be mounted on the scanning unit. In practice, however, it is convenient to provide a modulation control signal coupling system having one portion mounted on the scanning unit and another portion separate from the scanning unit and connected to a source of modulation control signals in use, the two portions being coupled by a non-physical link so that modulation control signals can be passed therebetween. The non-physical link is preferably an optical communication link but could include other forms of non-physical communication such as a RF link. Typically, therefore, the portion of the modulation control signal coupling system mounted on the scanner comprises a photodetector and the other portion of the system is an optical signal generator such as a laser which is modulated with the control signal information.

The means for generating a plurality of modulated radiation beams could comprise separate beam sources such as lasers, or a single source and a beam splitter to which a beam from the source is fed. Modulation can be achieved either by directly modulating the sources (where separate sources are provided) and/or by passing unmodulated beams to respective modulators such as electro-optic or acousto-optic modulators.

The modulation of the beams with image information can be achieved in any conventional manner but typically the beam will be modulated in an ON/OFF manner according to whether or not the corresponding pixel is to be exposed or not on the record medium. In general, a single record medium will be provided on the support but in some cases several media could be provided, for example one for each colour separation in the case of a multi-coloured image.

Typically, the means for causing relative rotation and traverse movement will cause rotation and traverse movement of the scanning unit alone while the support remains stationary. However, the support could be moved instead or the means could cause movement of both the support and the scanning unit. For example, the scanning unit could be rotated while the support is traversed relative to the unit.

BRIEF DESCRIPTION OF THE DRAWINGS

An example of an internal drum image setter according to the invention will now be described with reference to the accompanying drawings, in which.

DETAILED DESCRIPTION OF THE EMBODIMENT

Figure 1:
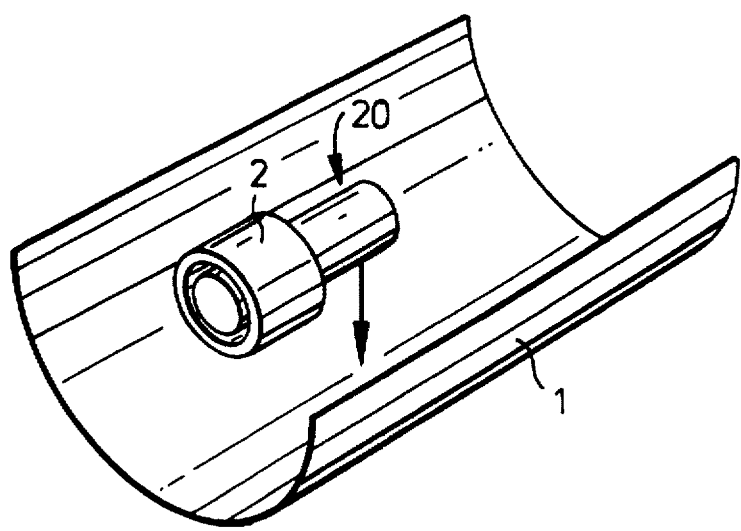
FIG. 1 is a partial, schematic, perspective view of the image setter with parts omitted for clarity; and, FIG. 2 illustrates the arrangement of components on the spinner and associated electronics shown in FIG. 1 in more detail.
Figure 2:
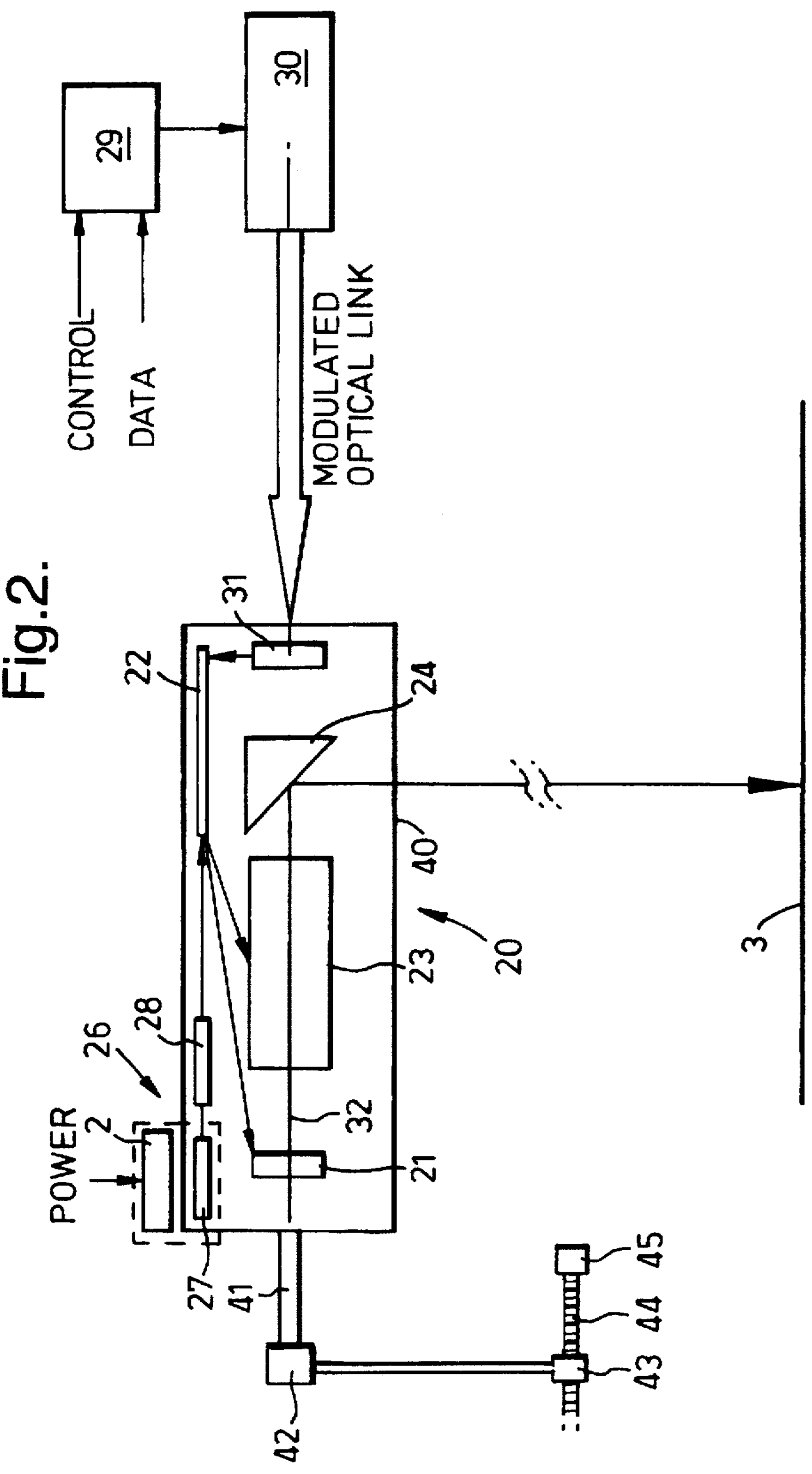

The imagesetter is shown schematically in FIGS. 1 and 2 with most parts omitted for clarity. The imagesetter comprises a semi-cylindrical drum 1 on the internal surface of which a record medium such as a photographic film 3 is mounted in use. A scanning unit or spinner 20 is mounted within the drum 1 with the axis of the spinner assembly coaxial with the axis of the drum. The spinner is mounted in a conventional manner on a support 40 which can traverse parallel with the axis of the drum. The support is connected for rotation with a spindle 41 coupled with a motor 42. The motor 42 is connected via a collar 43 with a lead screw 44 coupled to a rotating traverse motor 45 connected to control electronics (not shown). The support also carries a motor for rotating the spinner 20. Power is coupled into the components on the spinner 20 via an induction ring 2 mounted around the rotating spinner body as will be described in more detail below.

FIG. 2 illustrates the scanning unit or spinner 20 shown in FIG. 1, in more detail. On the scanning unit 20 are mounted a number (typically two) of laser sources 21 which are individually controlled from a decoder and driver board 22. Beams generated by the sources 21 indicated schematically at 32 are focused by an optical focusing system 23 and impinge upon a reflector 24 which reflects the beams onto the film 3.

Power for the board 22 is obtained from a source (not shown) which supplies power to the stationary induction ring 2. The induction ring 2 acts as a generator producing an alternating current in a cooperating receiver 27 on the spinner body. In this embodiment, a magnetic field is produced via coils (not shown) positioned around the induction ring 2. On the spinner 20, the receiver 27 is in the form of pick up coils extending around the circumference of the spinner in which an alternating current would be induced as the spinner rotates. Although the ring 2 is shown as a continuous ring, it may be separate coils located around the circumference. It should also be noted that magnetic coupling may cause the spinner 20 to precess introducing a visible pattern on half-tone images. To avoid this, an electromagnetic coupling could be used at the end of the spinner 20 to couple power across the gap using RF induction. This could consist of a fixed (non-rotating) oscillator and a tuned resonance circuit rotating in the spinner. The power would be electromagnetically coupled into the resonant circuit in the spinner which would then be rectified and regulated to provide power for the light sources. This would reduce the forces acting upon the spinner and hence help prevent precession. In some configurations, it would be advantageous to use more than one oscillator or resonant circuit. It is also possible to power the spinner via a light source and detector. Power which has been inductively coupled to the receiver 27 is fed via a regulator 28 to the board 22.

The beams from the sources 21 are modulated with image information obtained from a store (not shown). Typically, this information will determine whether or not a pixel on the film 2 is exposed. This digital data is supplied via a control computer 29 which multiplexes the data for the number of beams involved and feeds the multiplexed data as a control signal to a laser 30. The laser 30 is then modulated in accordance with the supplied image data and the modulated laser beam is supplied along the axis of rotation of the scanning unit 20 to a photodetector 31 mounted on the scanning unit which generates an electrical signal which is fed to the board 22. The board carries a decoder which decodes the incoming signal and translates it into separate modulation control signals which are fed to the sources 21.

The data could be encoded via any number of methods, e.g. i) time division multiplexing, ii) pulse width modulation, or iii) wavelength division multiplexing using multiple sources for the optical link. In the case of time division multiplexing, the data for each exposure source would be sent in a pre-defined time window and the data for each source would then have to be demultiplexed on the spinner 20 and buffered prior to being clocked out at the appropriate rate to the source.

I claim:

1. An output scanner for recording an image on a radiation sensitive medium, the scanner comprising an at least partially cylindrical support which carries said medium, said medium facing radially inwardly; a scanning unit positioned radially inwardly of said support and having means for generating a plurality of modulated radiation beams, said beams being modulated with respective image information, and a reflector for reflecting said plurality of beams onto said medium at respective, different positions; means for focusing said beams onto said medium; and means for causing relative rotation and traverse movement between said scanning unit and said support about and along the axis of said support respectively.

2. A scanner according to claim 1, wherein said focusing means is mounted on the scanning unit.

3. A scanner according to claim 1, further comprising an inductive power coupling system having one portion mounted on said scanning unit and another portion separate from said scanning unit and coupled to a power source, the two portions being positioned so that they cooperate to enable power to be inductively coupled to said one portion from said another portion.

4. A scanner according to claim 1, further comprising a modulation control signal coupling system having one portion mounted on said scanning unit and another portion separate from said scanning unit and connected to a source of modulation control signals, said two portions being coupled by a non-physical link so that modulation control signals can be passed therebetween.

5. A scanner according to claim 4, wherein said non-physical link is an optical communication link.

6. A scanner according to claim 5, wherein said one portion of said modulation control signal coupling system mounted on said scanner comprises a photodetector and said another portion of the system is an optical signal generator which is modulated with the control signal information.

7. A scanner according to claim 6, wherein said optical signal generator is a laser.

8. A scanner according to claim 1, wherein said means for generating a plurality of modulated radiation beams comprise separate beam sources.

* * * * *